United States Patent [19]

Cheng

[11] 4,297,841
[45] * Nov. 3, 1981

[54] CONTROL SYSTEM FOR CHENG DUAL-FLUID CYCLE ENGINE SYSTEM

[75] Inventor: Dah Y. Cheng, Los Altos Hills, Calif.

[73] Assignee: International Power Technology, Inc., Sunnyvale, Calif.

[*] Notice: The portion of the term of this patent subsequent to Dec. 12, 1995, has been disclaimed.

[21] Appl. No.: 59,591

[22] Filed: Jul. 23, 1979

[51] Int. Cl.³ .............................. F02C 7/00; F02C 7/10
[52] U.S. Cl. ..................................... 60/39.3; 60/39.53; 60/39.55

[58] Field of Search ................... 60/39.03, 39.05, 39.3, 60/39.53, 39.55

[56] References Cited

U.S. PATENT DOCUMENTS

| | | | |
|---|---|---|---|
| 3,693,347 | 9/1972 | Kydd | 60/39.3 |
| 3,978,661 | 9/1976 | Cheng | 60/39.5 |
| 4,128,994 | 12/1978 | Cheng | 60/39.55 |

*Primary Examiner*—Louis J. Casaregola
*Attorney, Agent, or Firm*—Limbach, Limbach & Sutton

[57] ABSTRACT

A control system is disclosed for controlling Cheng dual-fluid cycle engines over a wide operating range to maintain high efficiency under partial load conditions.

7 Claims, 14 Drawing Figures

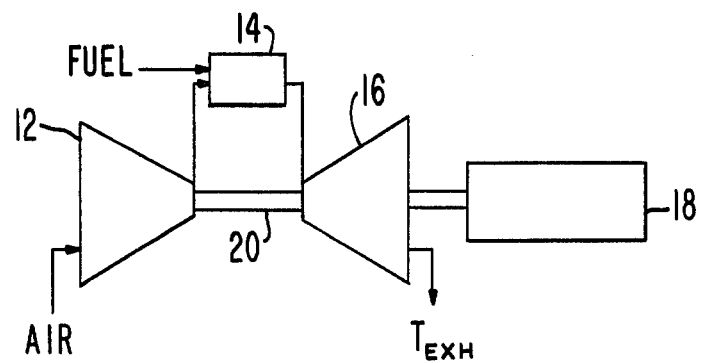
FIG. IA
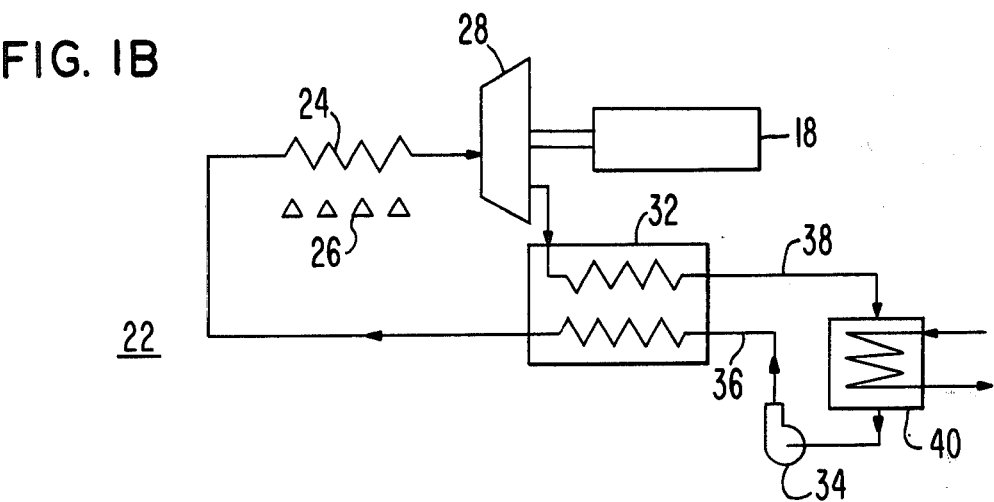
FIG. IB
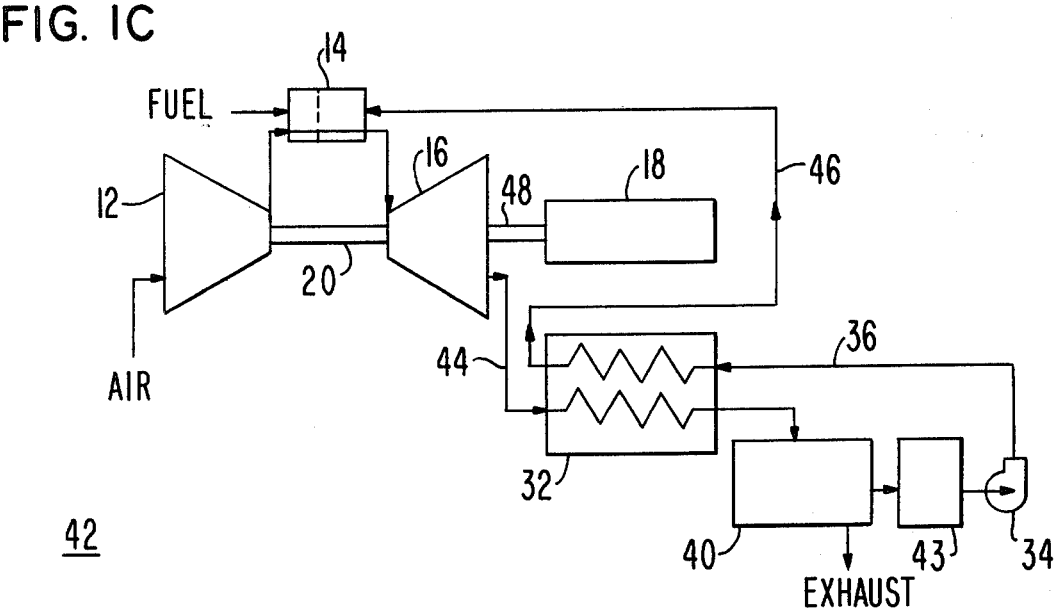
FIG. IC

CONTROL SYSTEM FOR CHENG DUAL-FLUID CYCLE ENGINE SYSTEM

BACKGROUND OF THE INVENTION

This invention relates to heat engine control systems, and in particular to a control system for a Cheng dual-fluid engine.

U.S. Pat. No. 4,128,994 and pending U.S. patent application, Ser. No. 967,108, Regenerative Parallel Compound Dual-Fluid Heat Engine, (referred hereinafter collectively as the prior Cheng cycle patent) describe the dual-fluid (Cheng) cycle heat engine. This engine, which employs parallel Rankine and Brayton cycles, requires a critical balance of operating parameters to produce high thermal efficiencies. For any given set of cycle parameters, the prior Cheng cycle patent referred to above, teaches that an efficiency peak exists only at a unique ratio of Rankine to Brayton fluids. Either too much or too little Rankine fluid leads to reduced cycle efficiency.

The prior Cheng cycle patent defines the peak operating condition cycle parameters to design an engine for 100 percent load. Because of the parallel combined nature of the Brayton and Rankine cycles in this engine, the quantity and quality of steam that can be generated by a given engine configuration can be varied freely over a range. The control path for the steam cycle is essentially independent of that for the gas turbine cycle. The control path for throttling the engine is essentially free or undefined. Thus to reduce engine power from the peak operating points to reach partial load output conditions poses a difficult control problem that involves precision control of the air flow, fuel flow, and steam flow.

In addition, because of the nature of the parallel compound fluid engine, several independent parameters are defined somewhat arbitrarily by the designer or fixed by some operational constraint such as synchronous speed of a generator for example. These include the compression ratio (CPR), turbine inlet temperature (TIT), compressor RPM and work turbine RPM, as well as those determined by the air, fuel and steam flows, which are air-fuel ratio (A/F), specific heat input rate (SHIR), steam-to-air ratio ($X_{mix}$), and total mass flow. Among the constraints on operating this engine at variable load conditions are the boiler surface area, boiler pressures, and the degree of superheat of the steam. Taken together this array of parameters makes design of a control system both difficult and unique.

The waste heat boiler for the dual-fluid engine system is normally designed for the peak efficiency condition at design load. Of course, once the heat exchanger is built, the surface area for the heat exchanger is fixed. If one desires to operate the engine at over-load conditions, the required surface area to generate more steam is not available unless the system has been designed with a boiler that is oversized for the design load condition. On the other hand, when the engine is operated under partial load conditions, the area of the heat exchanger is in excess of needs, thus permitting operation at decreased differences in exhaust gas and boiler temperature.

For a given turbine inlet temperature and compression ratio, peak work output efficiency of the dual-fluid cycle engine occurs only at a certain steam-to-air ratio. The ratio of steam-to-air is precisely defined as corresponding to maximum recovery of exhaust heat by the steam within designated turbine temperature limits of the engine. Steam is generated by recovering the exhaust waste heat at pressures that are relatively low when compared to the pressures usually used in a steam Rankine cycle following a gas turbine, the so-called combined gas/steam (COGAS) system.

In the Cheng dual-fluid cycle system the steam is injected into the engine before the work turbine and both combustion gases and steam deliver work to the turbine. Since the energy of the steam is derived from the exhaust of the same work turbine, or turbines, the system contains a feedback loop which must be solved in designing a control system.

The Cheng cycle is complicated in other ways. Unlike a gas turbine engine the exhaust temperature of the Cheng cycle turbine at a given inlet temperature and fixed pressure ratio is no longer uniquely defined by the turbine characteristics. It also depends on the steam-air mixture, $X_{mix}$. Steam and combustion air have different thermodynamic properties, namely, specific heats, and their ratio. Air has a higher gamma function, i.e., specific heat ratio, than steam. In expanding a mixture of combustion air and steam through a turbine more work is produced for a given pressure ratio expansion than can be produced by expanding the air and the steam separately through the same pressure ratio.

The details of this synergistic effect were disclosed in the prior Cheng patent. As discussed there the peak efficiency can be identified with a minimum "effective" temperature. But because the "effective" temperature is a measure of the thermodynamic potential that cannot be directly measured by a thermometer or thermocouple device, the feedback control design is even more difficult. In this invention a control system is disclosed to resolve these difficulties.

As disclosed in the prior Cheng patent, the maximum heat recovery rate does not occur at the lowest waste heat boiler gas exit temperatures. The latent heat of evaporation of the steam in the mixture gas is generally not recovered. Physically, if too much steam is used, the exit (engine injection) temperature of the steam from the waste heat boiler is low due to the large amount of water used to recover the waste heat. The heat loss due to the latent heat content of the exhaust gas exiting the boiler is very large. On the other hand, if the steam quantities are insufficient the heat exchanger exit temperatures of the exhaust products become excessive, and the engine will not have reached its improved efficiency potential. For a given set of parametric constraints the peak efficiency occurs at the steam-air ratio corresponding to the maximum rate of waste heat recovery. This is not known unless the constraints on the boiler design are given.

Traditionally, prior art control systems for gas turbines adjust for the load on the gas turbine by merely varying the injection rate of fuel, thereby increasing or decreasing the turbine inlet temperature. According to thermodynamic laws a higher working temperature provides not only higher work content but, generally, a higher thermal efficiency. One would presume that in the dual-fluid cycle however, the maximum continuous-operation turbine inlet temperature corresponds to the maximum efficiency design point of the engine. One would also presume that the partial load condition could be obtained by merely reducing the amount of fuel and steam injected into the engine system while maintaining the maximum turbine inlet temperature. However, neither of these presumptions are correct.

SUMMARY OF THE INVENTION

It is therefore an object of the invention to provide an improved control system for a Cheng dual-fluid cycle engine.

Another object of the invention is to provide a method and system for controlling a Cheng dual-fluid cycle engine for maximum efficiency at off-design point loads.

Another object of the present invention is to provide a system and method of controlling a Cheng dual-fluid cycle engine which provides positive engine control, even though there are a number of independent engine control variables.

In accordance with the present invention higher efficiencies are maintained in the Cheng dual-fluid cycle engine under partial load conditions by reducing rather than maintaining the turbine inlet temperature. This is accomplished by properly adjusting the steam-to-air ratio and air-fuel ratio through a positive control system having independent fuel and steam control loops. One of the important features of the subject invention is the linking of all operating parameters at conditions that yield maximum work output efficiency for every partial and over-load condition across the entire load range. This becomes a primary objective of the control system.

In accordance with another aspect of the invention, if the engine is to be used for both work output and steam generation (co-generation) a different objective is demanded of the control system. The co-generation control path as a boundary for controlling the engine operation is also set forth.

The sets of combinations of engine operating parameters for highest efficiency at each partial load is computed by methods similar to those described in the prior Cheng patent using engine component specifications and ambient conditions, except that the engine configuration is fixed rather than "rubberized". In other words, in initially designing the dual-fluid cycle engine, the designer is free to use whatever component sizes he wishes, but once the engine is designed and built, such freedom does not exist when the engine is operated at other than 100% load conditions. Consequently some of the fixed quantities in the engine design using the referenced patents such as temperature differences in the "neck" and "top" of the heat exchanger, become variables in deriving a control scheme while the heat exchanger surface area, which was free to float to any necessary value to meet the temperature difference specification, is now fixed.

BRIEF DESCRIPTION OF THE DRAWINGS

FIG. 1A is a schematic representation of a simple gas turbine; FIG. 1B of a simple steam turbine engine; and FIG. 1C of a simple Cheng dual-fluid cycle engine.

DESCRIPTION OF THE PREFERRED EMBODIMENTS

Figure 2:
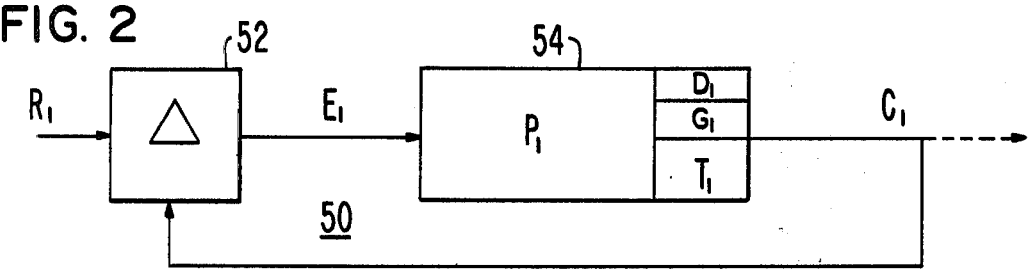
FIG. 2 is a block schematic representation of a standard feedback control system for a simple gas turbine engine.

To facilitate understanding the control system for such a unique engine system, the Cheng dual-fluid cycle engine can be superficially dissected into two parallel operating cycles as shown in FIGS. 1A and 1B. FIG. 1A illustrates a simple gas turbine engine 10 which includes a compressor 12, a combustion chamber 14, a turbine 16, and a load 18. Ordinarily, the controlling parameters are the turbine inlet temperature, TIT, the compression ratio, CPR, and the engine RPM.

Sometimes, due to the reluctance to put measuring probes before the highly-stressed rotating turbine, the turbine exhaust temperature is used as a measure of TIT. The turbine outlet temperature $T_{exh}$, is linked in a one-to-one corresponding fashion with the turbine inlet temperature through knowledge of the turbine characteristics. Thus the controlling parameter is the fuel flow to the system which effects the turbine inlet temperature of the engine directly.

The engine has operating limits, of course, due in part to the inertial nature of the heavy engine rotor 20. Therefore the fuel control system must have a differential loop that anticipates the engine response and programs the fuel requirement to produce the response to load variation without exceeding turbine inlet temperatures. The gas turbine has an inherent partial feedback loop because of the fact that the turbine-produced power drives the compressor. Therefore, only the power in excess of that required by the compressor is available to drive the load.

FIG. 1B depicts a steam (Rankine) cycle engine 22 operating within a Cheng-cycle dual-fluid engine including fired boiler 24, heat input 26, turbine 28, load 18, waste heat boiler or heat exchanger 32, and pump 34. This system is unique in that the steam expanded through the turbine 28 gives away much of its discharge heat to the oncoming water and steam in line 36 in waste heat boiler 32. After discharge from the boiler the exhaust steam, line 38, is condensed in condensor 40 for return and reuse in the cycle or wasted in an open cycle. In either case feed water is pumped through the waste heat boiler 32 to become superheated steam. The steam is fed into the fired boiler 24 and heated further to the designed gas turbine inlet temperature, determined by the turbine inlet temperature of the gas turbine of FIG. 1A before it is expanded through turbine 28. The fired boiler 24 is eliminated when the two cycles are operating in parallel because the additional heating of the steam is done by mixing with the air combustion products. If the steam cycle were not operating in parallel with the gas turbine, the steam would have to be heated by an external heat source in the fired boiler to reach such high temperatures.

FIG. 1C is a block schematic diagram of the Cheng dual-fluid cycle engine 42 illustrating the two cycles in parallel. Where applicable the reference numerals of components of FIGS. 1A and 1B are used in FIG. 1C. A detailed description of this engine cycle is set forth in the prior Cheng patent reference above. Added to the heat engine 42 of FIG. 1C is a waste water clean-up 43 before pump 34.

An important feature of operating the two cycles in parallel is that the waste heat of the combustion gas and steam passing through line 44 is recovered by the recycled steam passing out of the waste heat boiler 32 through line 46.

The combining or superimposition of the two cycles in a parallel arrangement simplifies the component mechanical arrangement of the powerplant. The engine has only one output shaft 48; additional heating of the steam by the combustion products is simple; and the steam turbine is eliminated. This represents a significant saving in costs of producing such an engine as compared to the typical "combined cycle" engine. However, the control functions become more complex.

Although the Cheng cycle can be dissected superficially into two parallel cycles, the mutual interaction between the gaseous working fluid of the Brayton cycle and the liquid vapor working fluids of the Rankine cycle produces more than parallel work output. Air has a gamma function close to 1.4 and steam has a gamma function close to 1.28. The gamma function (specific heat ratio) is implicitly dependent on both temperature and pressure. The mixing of the working fluids makes the expansion process dependent on the mixture ratio of the working fluids as well, because the proportional relationship between turbine inlet temperature and exhaust temperature of a simple gas turbine or a simple steam turbine at a given pressure ratio and component efficiency does not hold for a Cheng-cycle system.

For partial load operation conditions, both the turbine inlet temperature corresponding to best efficiency and the respective working fluid ratios have to be computed for an engine of fixed hardware components. Finding the partial load efficiency peak of a given engine experimentally, while possible, would be time consuming and difficult due to the double feedback nature of the Cheng cycle. Instead, the correct operating parameters for each point representing a range of partial load operations can be calculated using the method indicated in U.S. Pat. No. 4,128,994 except that the calculations must be made at partial load and with real (fixed) engine component characteristics. The highest efficiencies at reduced load occurs, surprisingly, at reduced turbine inlet temperatures, which the control system produces as a result rather than as a controlled reference variable.

To illustrate the differences in the control system of the present invention a control system concept applicable to the series combined cycle (COGAS) engine is first described. In FIG. 2, a standard feedback control system 50 for a simple gas turbine is illustrated schematically. $R_1$ indicates a desired setting based upon the engine load. $R_1$ is compared with a feedback signal indicative of the actual output setting at comparator 52. An error signal $E_1$ results which is sent to control unit 54, which provides a signal to increase or decrease the fuel flow depending on error $E_1$. As the fuel flow changes, a new feedback signal $C_1$ based upon the new actual fuel flow, is sent back to the comparator 52. Control unit 54 has certain boundary limits in order to avoid compressor stall. The control system 50 must have a built-in auxiliary control loop for engine start-up, and shut-down but it is not discussed here.

The controlling parameter in this case is the fuel flow rate, which establishes a certain air-fuel ratio to obtain the turbine inlet temperature necessary to produce the desired temperature.

Figure 3:
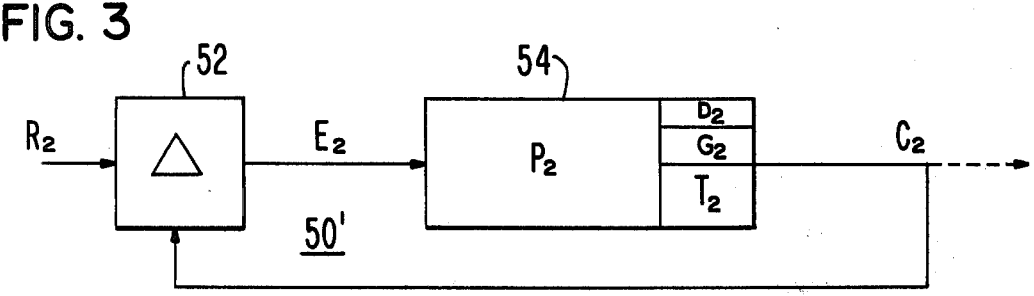
FIG. 3 is a block schematic representation of a standard feedback control system for a simple steam turbine engine.

In FIG. 3, the same simple control loop 50' is diagrammed for the Rankine or steam cycle system. In a COGAS system, the steam cycle follows the gas turbine cycle in a serial fashion. A preset load condition, as given by $R_2$, is compared with the feedback signal $C_2$ at comparator 52, which in this case can be the steam temperature, the turbine exhaust temperature, boiler pressure, etc., to produce an error signal $E_2$. This signal is sent to the controller 54. The controller 54 either increases or decreases the steam flow rate as the control parameter instead of the fuel flow rate in the gas turbine system 50.

To compensate for the time lag of components response, such as the inertia of the turbine wheels for acceleration and deceleration, boiler pressure build up and blowdown, it is necessary to incorporate integrated response, proportional control and differential controls described above into both the gas turbine 50 control loop and the steam cycle control loop 50'. The integrating control smooths out small, fast variations within a characteristic time, so that the engine control does not have to chase the high frequency, small perturbations. If a sudden increase of engine load is required, the differential response advances the fuel and steam rate beyond the steady state flow rates temporarily, then transfers the control function to proportional control, $G_1$ which drives the control parameters to steady-state values for the load. The reset times, having characteristic time tailored to the component characteristics, must be matched with component systems dynamics. If the engine is unable to reach the steady state condition within the reset times $T_1$ and $T_2$, then a reset mode is started.

With the dual-fluid cycle engine the air, fuel, and steam flow rates can be adjusted to maintain the continuous rating maximum turbine inlet temperature. As pointed out previously, however, the design continuous-rating maximum turbine inlet temperature does not produce the highest efficiency at partial loads. When the DFC engine is operated over a range from idle condition to design load condition, the fuel/air ratio and steam air ratio operating parameters are essentially free unless some discipline is imposed to control them. This freedom is attributable to the somewhat independent nature of two feedback loops and the parallelism of the two cycles.

There are significant differences in finding the peak efficiency for off-load conditions for an engine which has already been built, compared with calculation of such peaks during the design of a dual-fluid cycle engine, which is described in the prior Cheng patent. These differences relate directly to the fact that a "real" engine system has specific fixed components. These components have characteristic performance values which must be taken into account in determining best engine efficiencies at loads different from the design load.

Thus, in designing the parameters for maximum efficiency for off-design load conditions for a "real" engine, one must take into account the following: (1) In the design case the surface area of the boiler is a computed result at given temperature difference constraints; but for a "real" engine the surface area of the boiler is fixed and the temperature differences are variable. (2) The turbine and compressor efficiencies of a real engine vary somewhat with air, fuel and steam flow rates, and engine RPM, and thus component efficiency maps must be programmed into the control to account for these performance variations. (3) Pressure losses through the system, particularly through the combustor, the steam injector, and the boiler also vary with flow rates, and these variations must be programmed into the control functions (4) The component response time in the engine system, particularly in the thermal lag of generating steam in the boiler and in the inertia of the rotor mass, must be accounted for in designing the control response. This is a factor not apparent in designing a "steady-state" operating condition for the engine.

Figure 4:
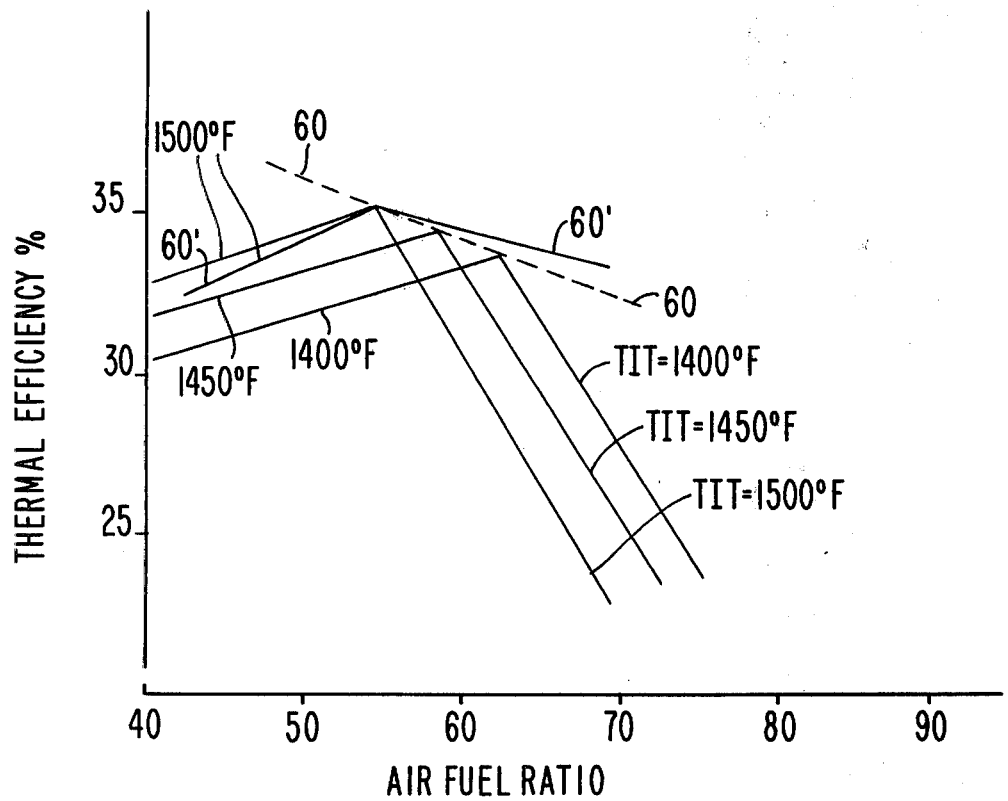
FIG. 4 is a graphical plot of efficiency of a dual-fluid cycle engine as a function of air-fuel ratio at various constant TIT.
Figure 5:
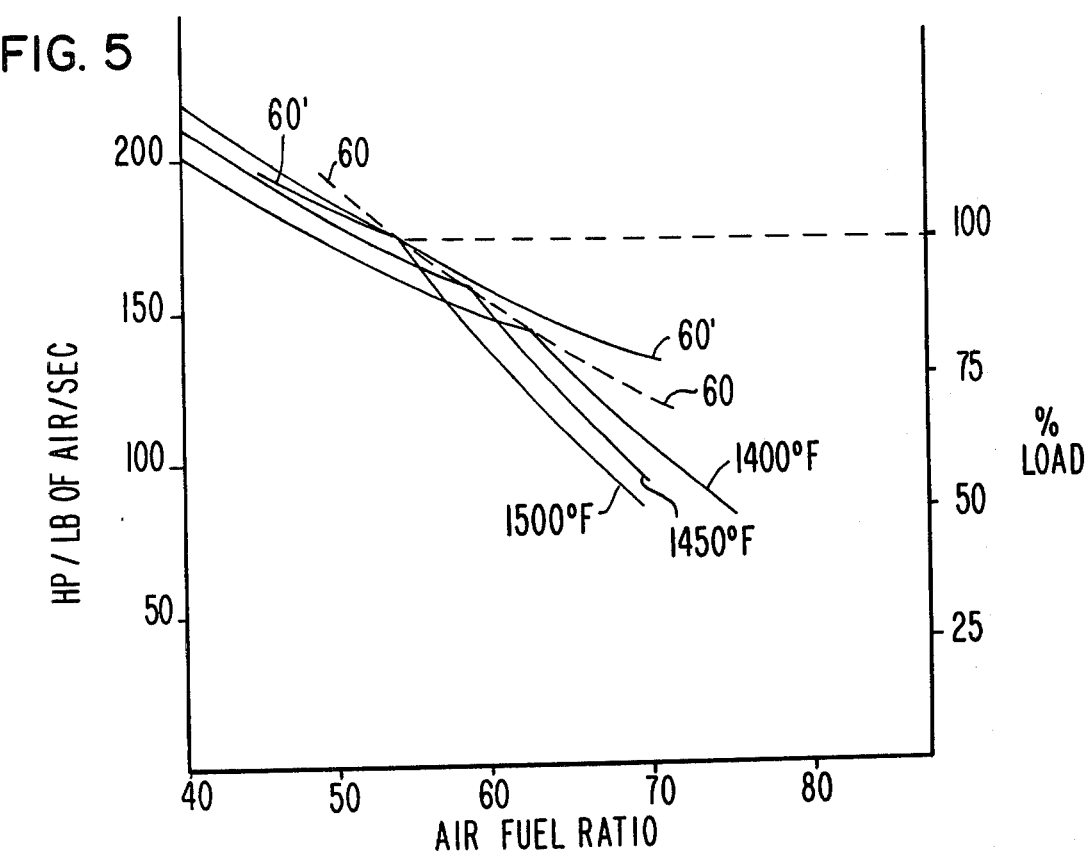
FIG. 5 is a graphical plot of shaft horsepower output for a dual-fluid cycle engine at various constant TIT as a function of air-fuel ratio.
Figure 6:
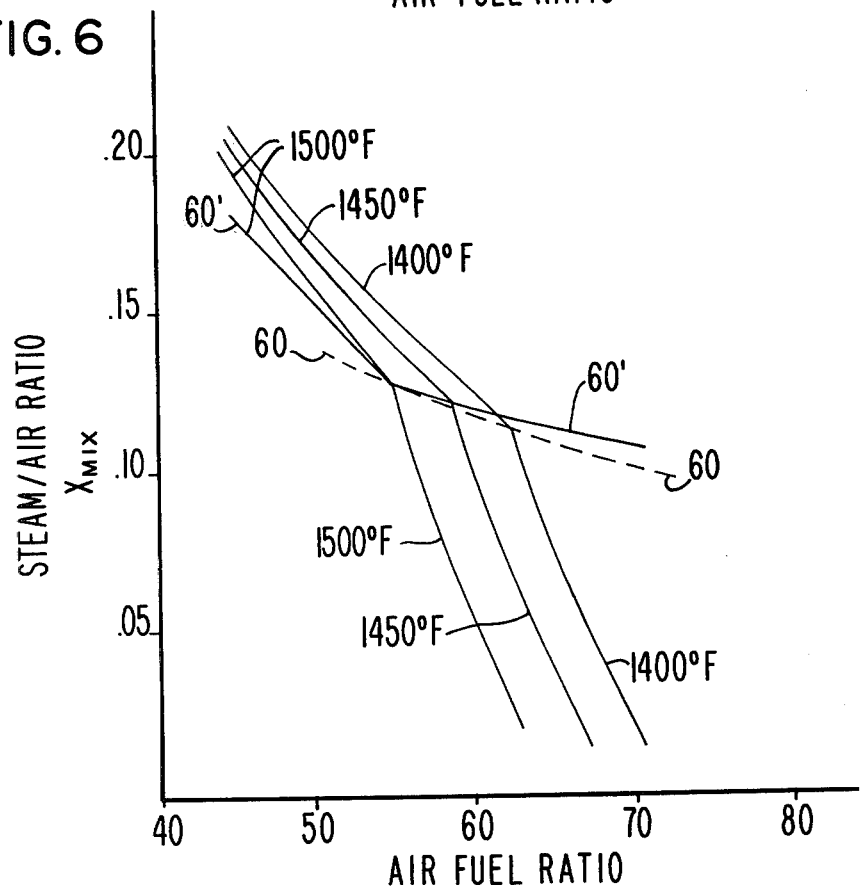
FIG. 6 is a graphical plot for a dual-fluid cycle engine of $X_{mix}$ vs. the air-fuel ratio at various constant TIT.

FIGS. 4, 5 and 6 are a series of plots for a specific engine to illustrate the control functions for that engine, in accordance with the present invention. FIG. 4 illustrates the thermal efficiencies for a given known, single-shaft turbine engine in terms of air/fuel ratio of a dual-fluid cycle engine at different load conditions. A number of examples of turbine inlet temperature conditions, namely 1400° F, 1450° F. and 1500° F. are shown, as an independent parameter within the plot. For this example, the engine has a compression ratio of 7.3 to 1, inlet pressure of 14.3 PSIA exhaust pressure of 15.1 PSIA, inlet temperature of 80° F. and 60% relative humidity.

Performance is plotted against air/fuel ratio in FIG. 4 because this represents the energy input to the engine 42. For a given turbine inlet temperature and compression ratio, there is only one air-fuel ratio corresponding to each load requirement at which the thermal efficiency reaches the peak. An engine design point control path 60 links all the peak efficiency design points at different TITs with a fixed $\Delta T$ "top" and "neck". This graph shows clearly the unexpected result that maximum efficiencies are achieved by a lowering of the turbine inlet temperature as the partial load gets smaller.

FIG. 5 represents the power output per pound of air flow through the turbine of FIG. 4 for the same turbine inlet temperatures, as a function of the air-fuel ratio. One can see that the peak thermal efficiency for such a single-shaft, constant RPM system, for which the compressor air flow rate is nearly constant, occurs at discrete air-fuel ratios. The loci of such points is indicated by the control path 60. If, in throttling the engine for lesser load (increased air-fuel ratio) one changes the air-fuel ratio and the steam-to-air ratio to maintain a fixed turbine inlet temperature at the lower power output of the engine, the engine efficiency falls off faster than if the turbine inlet temperature is also allowed to fall, and the steam-air and air-fuel ratios re-optimized. In other words a constant TIT at varying load conditions is not desirable to maximize engine efficiency.

FIG. 6 presents the data already shown in FIGS. 4 and 5 as a cross plot of steam-air flow ratio, $X_{mix}$, versus air-fuel flow ratio, at varying partial loads. This plot shows that the steam-to-air flow rate along a constant TIT operating path is highly nonlinear and as a matter of fact is discontinuous around peak efficiency points. The optimum efficiency operating line for a Cheng dual-fluid engine thus involves changing the air-fuel ratio, steam-air ratio and turbine inlet temperature simultaneously when going from the design load condition to a lesser load condition.

Normally the engine design is optimized at the maximum efficiency point corresponding to a continuous-running maximum turbine inlet temperature. Assuming this to be the case, to accommodate power loads above the design load of the engine, requires departure from the (apparent) optimum efficiency operating line in order not to exceed the assumed limiting turbine inlet temperature. Thus the "best" operating line has a discontinuity (change of slope) at or near the maximum efficiency point 72 for 100 percent load.

From the foregoing, the preferred engine operating line, corresponding to a variable turbine inlet temperature, are specified such that for a given load condition the correct air-fuel ratio and steam-air ratio to maintain high thermal efficiency at partial loads can be obtained. When fixed component conditions are realized, the engine can not follow the design point operating line at over load due to the lack of heat exchanger surface area. At less than 100% load the surface area allows the temperature differences $\Delta T$ "top" and $\Delta T$ "neck" to be reduced below that allowed in the design. The "real" control path is shown as 60′ in FIGS. 4, 5 and 6. This is explained in detail later. The control system described next is designed to achieve this result.

Figure 7:
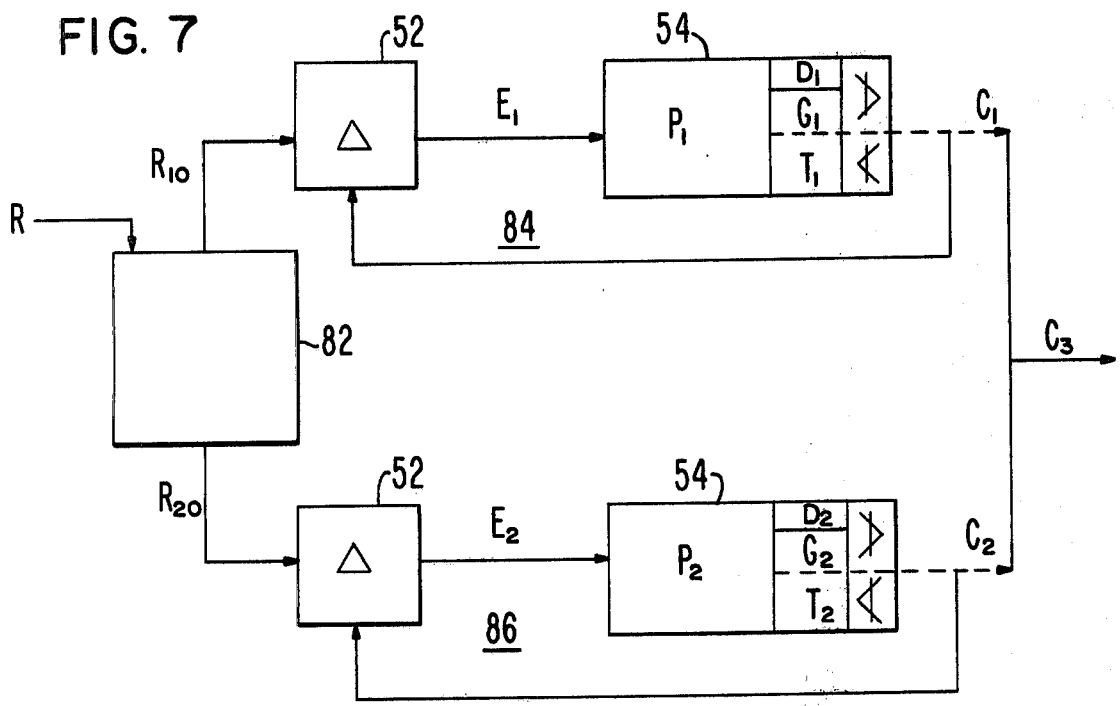
FIG. 7 is a block schematic representation of a control system for a dual-fluid cycle engine, in accordance with the present invention.

FIG. 7 is a block schematic of a control system 80 for a Cheng dual-fluid cycle engine. Control system 80 uses a pre-computed multi-dimensional contoured map stored in master memory 82. This stored map contains operating conditions which link the operating parameters for high efficiency operation at each load condition for the dual-fluid cycle engine. The control load setting R triggers predetermined signals $R_{10}$ and $R_{20}$ from memory 82 to separately establish desired operating points for a gas turbine servo system 84 and a steam servo system 86. The respective servo loops 84 and 86 then operate independently of each other to control, respectively, the fuel flow rate and the steam flow rate so that the engine operates at the locus of the highest peak efficiencies for that load, i.e. along the optimum control path shown in FIGS. 4–6. No over-all control feedback is provided; only feedback is provided within the separate gas turbine and steam control loops.

The components of the gas turbine control loop 84 and steam control loop 86 are basically the same as those shown in FIGS. 2 and 3 respectively for a gas turbine and steam turbine engine. Thus where appropriate, identical numerals used in FIGS. 2 and 3 are used in the following description. Referring to the gas turbine portion 84 of the control system 80, the input load setting $R_{10}$, set by memory 82 goes to the error comparison box 52 where the actual fuel flow is compared with the desired setting $R_{10}$ to produce error signal $E_1$. This signal is acted upon by control unit 54 which provides a control feedback signal $C_1$ for controlling the fuel flow. Controlling fuel flow basically controls the engine heat input rate. Controls to compensate for barometric pressure, ambient temperature, etc. are not described here but are within the scope of skill in the art of gas turbine controls.

Since steam passes through a dual-fluid cycle engine in parallel with the combustion products of air, the turbine inlet temperature is no longer uniquely determined by the fuel flow at a given load. The steam flow rate is equally important. The steam flow rate is controlled by the steam servo system 86. The input load setting $R_{20}$, set by memory 82 in response to a desired engine load condition, goes to comparator 52, producing an error signal $E_2$. This signal is acted upon by steam controller 54, which produces a feedback control signal $C_2$ which establishes the correct steam flow rate. The steam controller senses the boiler pressure and temperature. The combination of the control signals $C_1$ and $C_2$ provides the right control operating signals $C_3$ to accommodate the actual load output such that the engine can be operated on the peak efficiency contour for the given load requirement.

The differential, proportional, and the integrating signal processors in the respective steam and gas control loops 86 and 84 provide conventional servo-system control.

The flow rates of air and steam may be momentarily increased or decreased beyond the ultimate steady state flow rates corresponding to the new load command. The flow rate overshoots are designed a priori from knowledge of the engine component dynamic characteristics so that physical or characteristic performance limits of the equipment are not exceeded. In particular the fuel-air-steam ratios must be kept within the limits that would cause overheating of the turbine, and varied in a way to avoid compressor stall or surge. Fuel flow may not be dropped so suddenly with decreased load as to cause combustor flame out.

These dynamic limits are keyed into the differential processor, which compares the anticipated variation with the rate of change of fuel and steam flow rate. That is, it differentiates the flow rates with respect to time. Upon increase or decrease of load the differential processor controls the fuel and steam flow rate variation to initially overshoot the steady state flow requirement, then rapidly adjusts the overshoot to steady-state flow rates for the load.

The differential response is in action only if the rate of change of flow rate is larger than a preset rate of change of flow rate. The threshold function can be provided by a mechanical-hydraulic system, such as a spring loaded check valve, or by an electrical system having a threshold trigger voltage with a ramp function. If the rate of change of the flow rate is smaller than the preset rate of change of flow rate, the control signal simply goes to proportional control. The proportional control must be provided with a certain gain in terms of mechanical advantages or electrical amplification. The fuel flow rate is set according to the master control 82 command.

The error signals $E_1$ and $E_2$ are processed through integrating signal processors in both the gas and steam controllers. Any control system can be plagued with some high frequency shorter-duration noise inputs which are not true commands from the operator; mechanical vibration to the control handle transmitted through the floor, for example. Because the turbine system of a rotary machine has rotational energy stored in the rotor the engine does not have to chase short-time duration changes. Therefore, an integrated processor is used to filter out noises as much as possible. The characteristic time of the integrated processor can be determined a priori from the known engine system component dynamics.

The boiler 32 is an energy storage system that warrants the requirement of an integrating processor. For the boiler 32, in contrast to the turbine 16, inertia of the turbine wheels is replaced by thermal lags.

In accordance with the invention, the operating contour is determined a priori. The memory system 82 stores precomputed values for all the operating parameters, i.e., different RPM's, pressure ratios and temperatures. The memory 82 produces the two signals $R_{10}$ and $R_{20}$ dependent upon the particular set of operating parameters called for, and the load condition. This memory control system 80 need only obtained the command of an engine operator for a different load condition to determine what operating parameters are necessary to regulate the engine for operation at the peak efficiency.

The controlled parameters are: (1) fuel flow rate and (2) the steam flow rate. The memory 82 essentially eliminates the freedom of the control paths of the parallel combination of Brayton and Rankine cycle. As a result, for a given load condition away from peak load condition, the turbine inlet temperature is no longer maintained at the highest turbine inlet temperature for a given throughput. Rather, the turbine inlet temperature is computed for the load setting from a known engine operating map and stored in the memory system 82.

Therefore the control of the engine is accomplished by reference to the memory 82 in such a way that the load setting provides commands to the fuel setting and the steam flow rate setting without an over-all feedback control. The memory control system 80 constitutes an open-loop, positive control system rather than a feedback control system on top of two individual feedback systems.

DESIGN OF THE CONTROL SYSTEM

To design a control system 80, for an actual Cheng cycle engine it is required to know the control path a priori and to store it in the memory 82. FIGS. 4, 5 and 6 show typical steady state operating characteristics of a single-shaft dual-fluid cycle engine. These allow one to determine the limitations and characteristics of all the possible control paths, as will be explained.

The prior Cheng patent allows one to determine peak operating regions for a particular dual-fluid cycle engine design. A temperature difference $\Delta T_{top}$ and $\Delta T_{neck}$, for the heat exchanger 32 is assumed on the grounds of heat exchanger size and economic trade off. The required surface area for the heat exchanger varies at different turbine inlet temperatures, TIT, and compression ratios, CPR.

Once the engine is designed, the heat transfer surface areas for superheater, evaporator and economizer for heat exchanger 32 are fixed. The temperature differentials $\Delta T_{top}$ and $\Delta T_{neck}$ are no longer design constraint considerations. Under partial load conditions excess surface area is available in the waste heat boiler. Thus, the heat transfer area is greater than that required to maintain $\Delta T_{top}$ and $\Delta T_{neck}$ at less than 100 percent load. Consequently these temperature differences decrease. The fixed surface area of heat exchanger 32 is inadequate, however, to maintain the design $\Delta T_{top}$ and $\Delta T_{neck}$ along the overload control path above 100% load.

Figure 8:
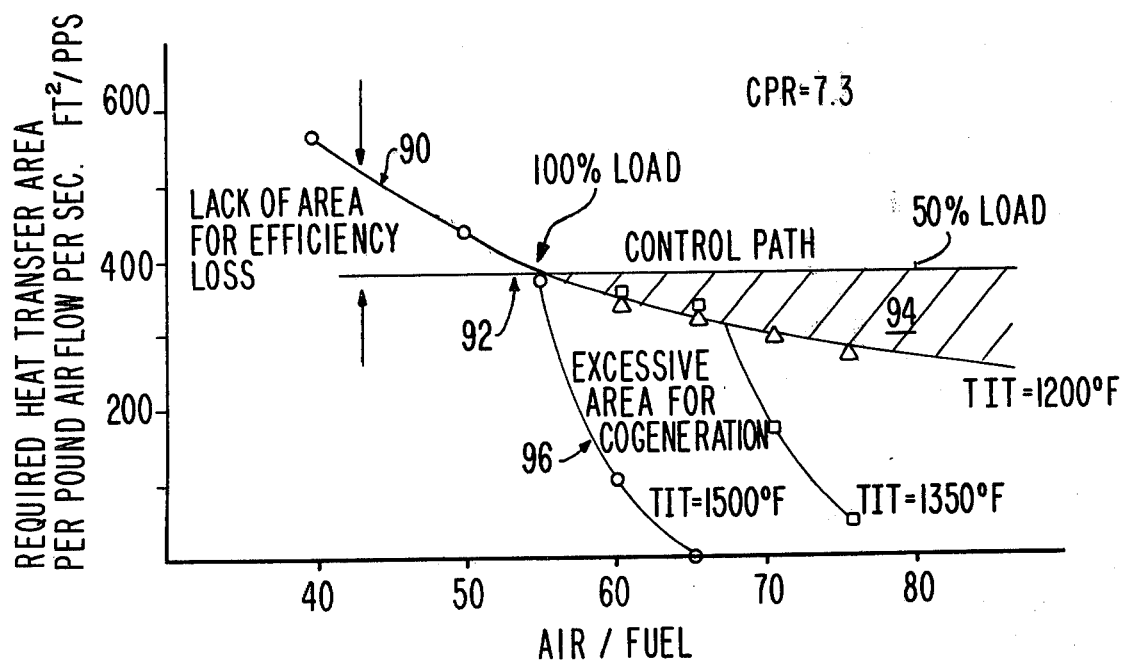
FIG. 8 is a graphical plot of the waste heat boiler (heat exchanger) of a dual-fluid cycle engine as a function of air-fuel ratio both for a design point and "real" heat exchanger.

The overload and partial load surface area requirements are shown in FIG. 8 which plots the heat exchanger 32 area per unit of air flow as a function of air-fuel ratio both for the design case 90 and an actual heat exchanger case 92. The "real" heat exchanger case 92 is a horizontal line passing through the design operating curve 90 at 100% load. The additional heat exchanger surface area available at partial loads means smaller $\Delta T_{top}$, hence higher engine overall efficiency at partial load. This is indicated by the cross-hatched area 94.

An example is now given to show how one chooses the control path of the Cheng cycle engine with given component sizes and to show how to create a control map to be stored in the master memory 82. As explained, one follows the teachings in U.S. Pat. No. 4,128,994 to first create engine design maps as shown in FIGS. 4, 5 and 6. Since peak efficiency conditions will shift due to changed ambient conditions, temperature, relative humidity and atmospheric pressure become direct inputs to the master memory 82 to call out the corrections. For purposes of this description, however, it is assumed that only constant ambient conditions exist.

Once the 100% load point is picked, the surface area of the waste heat boiler 32 is fixed and the engine no longer operates exactly according to the design point peaks, i.e. along control path 60 shown in FIGS. 4, 5 and 6. This is indicated by the actual optimum control path 60' in FIGS. 4, 5 and 6. This optimum control path is derived as follows.

Referring to FIG. 8 if one picks TIT=1500° F., and the peak efficiency point is designed for 100% of load, then the operating map is generated as a perturbation over that of the engine design map. This is accomplished by examining the horizontal control path 92 of "real" heat exchanger 32. As explained, improved efficiency results in the partial load region due to the available excess heat exchanger area. As also explained, during partial load conditions the prescribed maximum temperature difference between the exhaust gas mixture and the incoming steam are removed. The new peak operating point is computed based upon a steam/air ratio which satisfies the two conditions, set forth in the prior Cheng patent, simultaneously: (1) maximum heat recovery from the exhaust gases, i.e., lowest effective temperature of the exhaust gases and (2) maximum superheat steam temperature prior to entering the combustion chamber 14.

These seemingly conflicting conditions can be obtained due to the fact that superheater portion of heat exchanger 32 heats steam from the evaporator portion to as high a temperature as possible; and the evaporator of heat exchanger 32 heats as much water into steam as possible. So the two conditions are realized at different parts of the system. Thus, the two limiting factors to the operation of the heat exchanger 32 are: (1) its fixed surface area (2) its self-limiting temperature profile. So to compute the peak operating conditions for partial load conditions for an engine with a fixed heat exchanger one must use the given superheater evaporator areas as boundary conditions and remove the temperature difference constraints used in the prior Cheng patent.

Referring again to FIG. 8, if one wants to operate in the overload region, there is not enough surface area in heat exchanger 32 to generate the superheat steam, so the control parameters must change in a way which is below the designed maximum efficiency points. This is shown in FIGS. 4, 5 and 6, above 100% load.

The control memory 82 requires information on load versus steam flow and fuel flow, at given ambient temperature, relative humidity and atmospheric pressure. The peak efficiency points defining one optimum control path are therefore recalculated from the information in FIGS. 4, 5 and 6. This is compiled in FIGS. 9-11.

Figure 9:
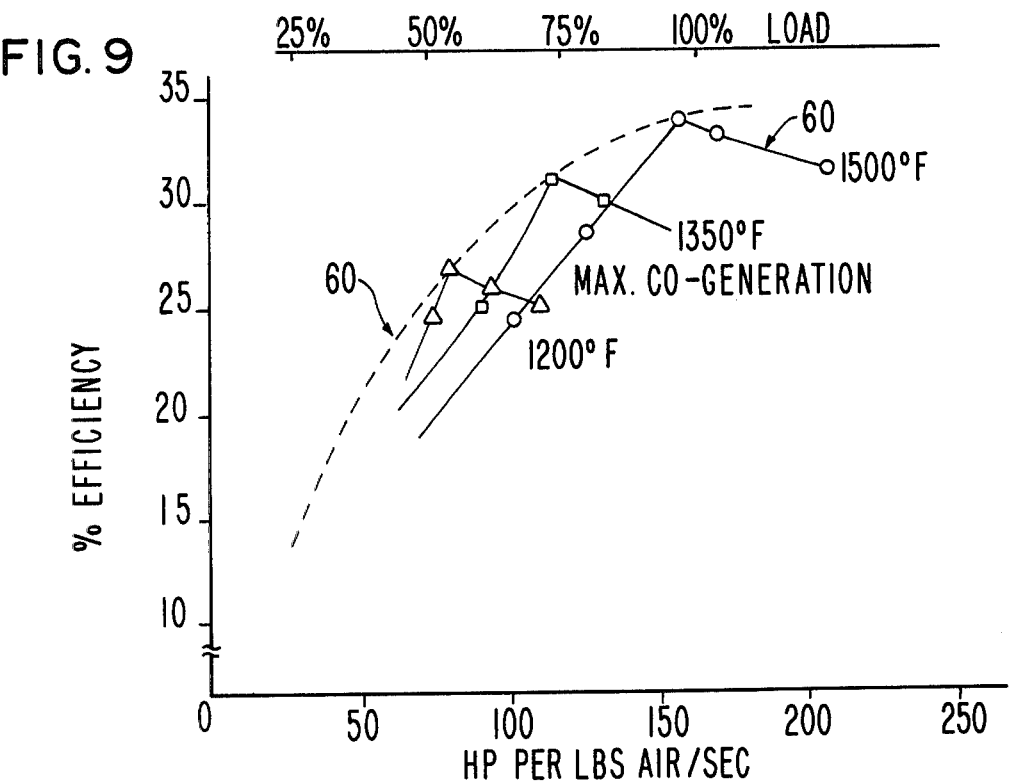
FIG. 9 is a graphical plot of engine efficiency as a function of horsepower per pound of air-flow per second for various constant TIT, for a typical dual-fluid cycle engine.
Figure 10:
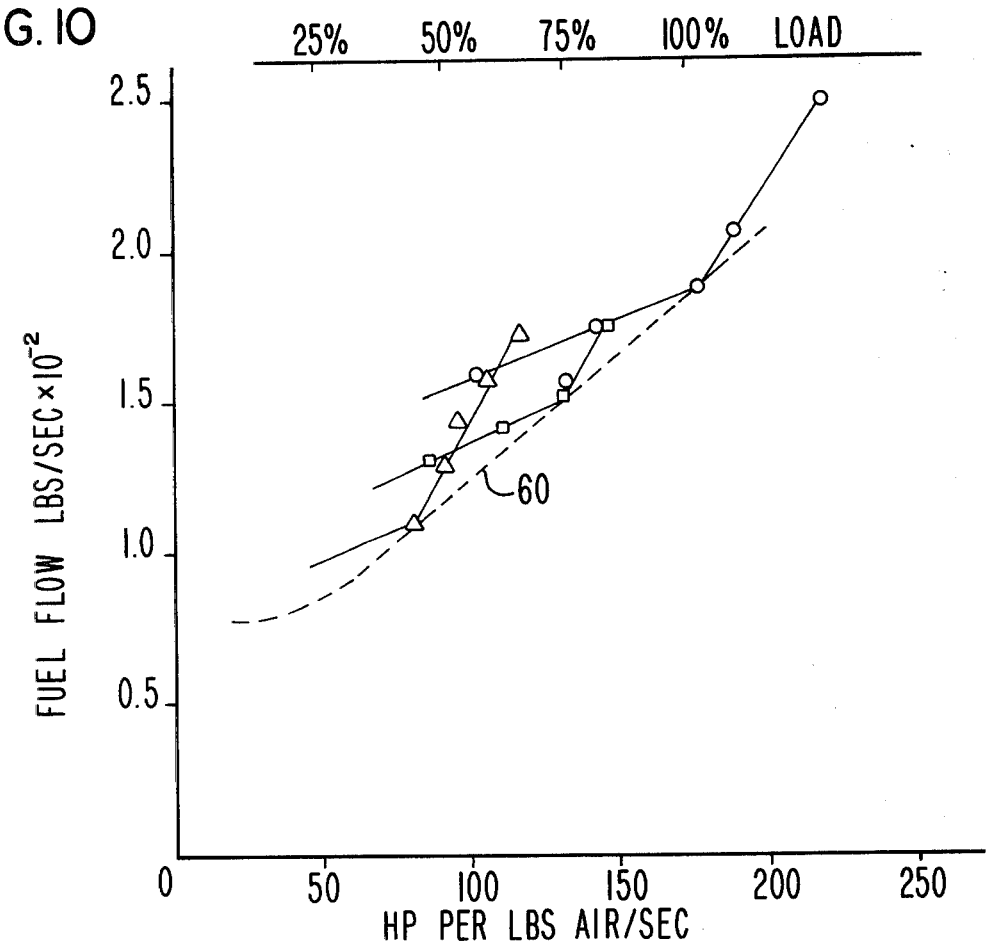
FIG. 10 is a graphical plot of fuel flow as a function of horsepower per pound of air flow per second, at various constant TIT, for a typical dual-fluid cycle engine.
Figure 11:
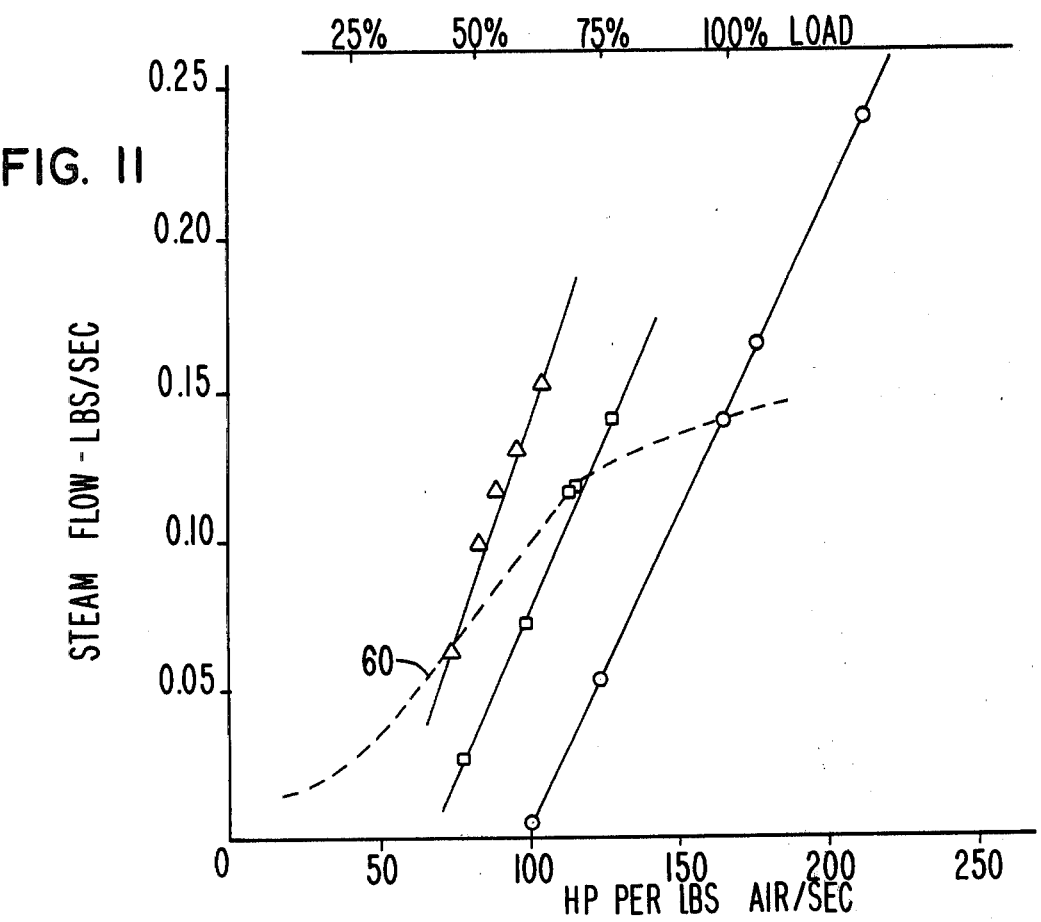
FIG. 11 is a typical graphical plot of steam flow as a function of horsepower per pound of air flow per second, at various constant TIT, and for a dual-fluid cycle engine at various load conditions.

FIG. 9 is a plot of efficiency, FIG. 10 is a plot of fuel flow, and FIG. 11 is a plot of steam flow all as a function of horsepower per pound of air flow per second. The control path 60 shows the control path of maximum efficiency. The load output in terms of horsepower for full and partial load is normalized to one pound per second air flow through the compressor, such that for a single-shaft constant-RPM engine for generating electricity the air flow rate is essentially a constant. Other engines having power turbines with variable RPM load, follow essentially the same procedure only the normalization factor is connected by air flow, due to RPM change according to a compressor map.

The steam flow and fuel flow, as a function of load control path is then taken directly from FIGS. 10 and 11 and is stored in master memory 82.

Figure 12:
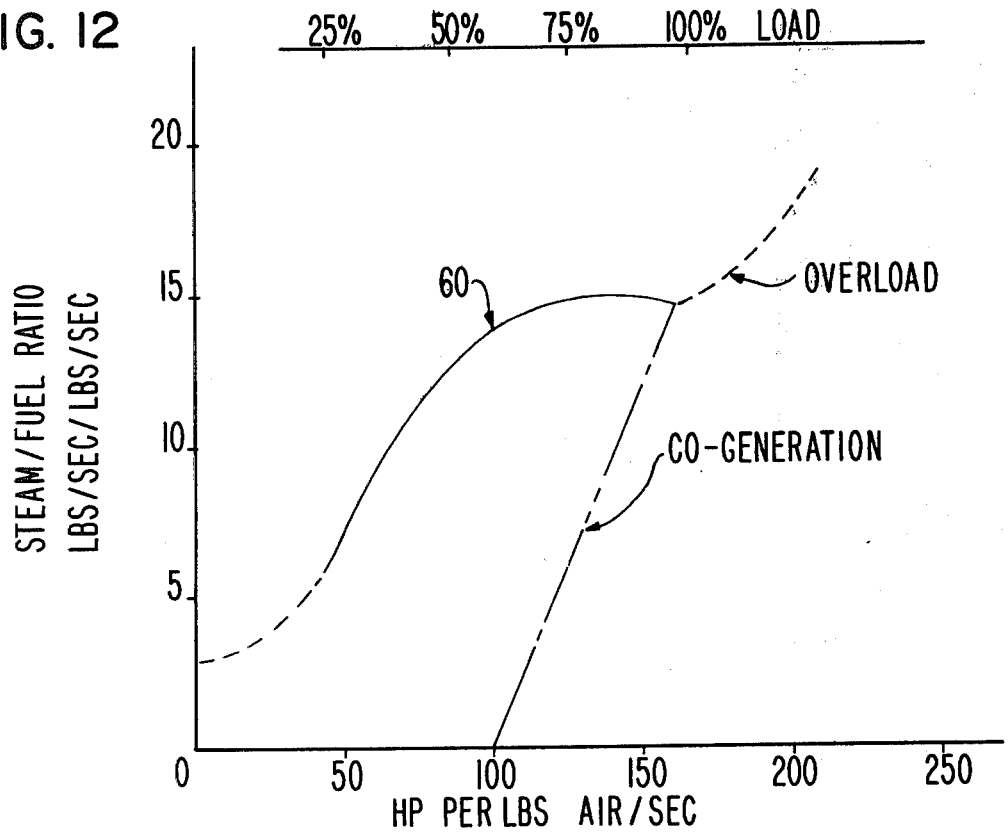
FIG. 12 is a typical graphical plot derived from FIGS. 9-11 of steam-to-fuel as a function of horsepower per pound of air flow per second or at various load conditions of a typical dual-fluid cycle engine.

As an alternative method to store control path information, one can link fuel control to steam flow rate. From FIGS. 9, 10 and 11 one can cross plot the control path 60 as a ratio of steam-fuel flow ratio as a function of horsepower per lb. of air flow per second as shown in FIG. 12. These relationships can be stored in memory 82 to link the fuel control with steam control.

Of course the parametric relationships stored in memory 82, based upon predetermined calculations may have to be altered slightly for actual better engine operation. Such "fine tuning" is accomplished experimentally.

CO-GENERATION

Efficiency of an engine system can be measured in either of two ways; one as a fraction of the available energy that is converted to work (shaft horsepower) output; the other the fraction of the total available energy that is utilized as either work or heat. Co-generation is a total energy system which utilizes the waste heat to generate process steam. The energy of the process steam is counted as an output of the system so that the overall efficiency is increased.

From FIG. 8, it is apparent that an alternative control path 96 for the engine is to reduce the steam-flow rate while reducing the load output so that the engine runs at maximum designed turbine inlet temperature. The excessive boiler 32 surface area is then used for co-generation, such that only the proper amount of steam is used in the Cheng cycle engine 42 at a given load.

The co-generation path 96 represents another limit of the choice of control path. Here the control path is bounded by constant maximum TIT. The first limit is the control path linking all the highest possible efficiency points at constant heat exchanger surface area. This follows the horizontal path 92. Other paths can be chosen in the region between path 92 and 96 to satisfy specific applications but generally they are bounded by the co-generation path 96 and the optimum engine efficiency control path 92.

SINGLE SHAFT VARIABLE-SPEED ENGINE

FIGS. 4, 5 and 6 show the complex nature of identifying the peaks for a single-shaft single-speed dual-fluid cycle engine. If the variable load can be accommodated by changing RPM then air flow and pressure ratio become dominant operating variables. Changing RPM occurs in the case for pumping a fluid, in contrast to driving a utility generator, where synchronous turbine-generator speed must be maintained. To identify the operating conditions for peak efficiencies for an engine with these additional variable parameters, two more operating maps are required. One can regard FIGS. 4, 5 and 6 as representative cross sections of three-dimensional maps where the additional dimension represents either compression ratio or air flow. Such plots can be readily made using the methods similar to those defined in the prior Cheng patent but with some differences in parametric conditions for each compression ratio or air flow, and then plotted or prepared as a contoured multiple-dimensional surface map.

DUAL SHAFT ENGINES

The use of a dual-shaft arrangement for the Cheng-cycle engine system permits the use of a variable-speed turbine to drive the compressor to supply whatever air flow is required to accommodate the load at high efficiency. To permit such variable-speed compressor operation the first turbine, or core turbine, that drives the compressor can be equipped with variable stator vanes. The variable stator vanes in such a case do not add another degree of freedom to the engine operation because the position of the guide vanes is determined by the required air and steam flow.

The added freedom of variable air flow and compression ratio required to drive the work turbine, which in turn may be either constant-speed or variable-speed, under its load condition, constitutes in essence a problem similar to that discussed above for the single-shaft variable-speed engine. The computations required to identify the maximum efficiency conditions corresponding to each load become increasingly complex. The best-efficiency optimum operating condition can be represented by a multiple-dimensional contoured surface in which each point represents the simultaneous variation of several of the engine operating parameters. It is evident that this control must be able to process the additional (compressor RPM or pressure ratio) input in determining how to establish the new operating parameters to accommodate the load, and it must be equipped with differential, proportional and integral control responses that operate on the additional input. From the multidimension control surface, a unique control path is singled out for a specific Cheng cycle engine.

It is apparent that such plots justify preparation only with specific engine component performance figures, FIGS. 4, 5 and 6, being for a specific engine configuration. The above discussion is considered sufficient to illustrate the method of the invention. The task of the control device that constitutes this invention is to operate along a control path on the multi-dimensional contour surface that represents the highest efficiency operating condition within the mechanical constraints of the equipment for each load.

It is clear that the design of a control system for a particular dual-fluid engine is highly specific to the characteristics of the components of that particular engine configuration. Furthermore, it is also clear that there are or can be innumerable mechanical, hydraulic or pneumatic servo devices involved in such control systems, including analog or digital computer devices to relate the inputs which are not disclosed herein but which are within the capabilities of one skilled in the art. For example protective devices would be employed. RPM governors, high temperature turbine inlet temperature limiters, boiler pressure limiters, and so on, which are not shown in the controller block background, would be integrated into the control system as in other prior art systems.

The link of the two parallel cycles is through the memory system 82. The memory 82 is preprogrammed electronically in a memory storage bank or by a mechanical cam and gear system or by a combination of both. For highest efficiency operation at any load the system must be programmed to guide the dual-fluid cycle to operate along the path which links the peak efficiency points. If the engine is to be used to co-generate power and heat, then a different control path which maintains highest continuous rating turbine inlet temperature and maximizes steam production at that operating condition is used. All dual-fluid cycle engine control paths will ordinarily be bounded by conditions corresponding to their objectives.

I claim:

1. A control system for a dual-fluid, Brayton/Rankine cycle engine comprising control means for following a control path defined by the locus of peak efficiency points at reduced loads, where the control path results in a declining turbine inlet temperature as the load decreases; and wherein said control means comprises:
   (a) a first control system for controlling the Brayton cycle part of the dual-fluid cycle engine;
   (b) a second control system for controlling the Rankine part of the dual-fluid cycle engine; and
   (c) memory means for setting the desired operating points of said first and second control systems, where the memory means contains predetermined settings for each of the two control systems for all load conditions, and wherein said predetermined settings comprise at least fuel flow rates and water flow rates.

2. In a dual-fluid heat engine comprising:
   a chamber;
   compressor means for introducing a first gaseous working fluid into said chamber, said compressor means having a predetermined pressure ratio (CPR);
   means for introducing a second liquid-vapor working fluid in the form of a vapor within said chamber at a defined second/first working fluid ratio (XMIX);
   means for heating said first gaseous working fluid and said second working fluid in the vapor form in said chamber at a defined specific heat input rate (SHIR);
   turbine means responsive to the mixture of said first and second working fluids for converting the energy associated with the mixture to mechanical energy, the temperature of said mixture entering said turbine means defining the turbine inlet temperature (TIT);
   counterflow heat exchanger means for transferring residual thermal energy from said exhausted mixture of first and second working fluids to said incoming second working fluid to thereby preheat the same to a superheated vapor state prior to its introduction within said chamber, and wherein XMIX and SHIR are selected so that for a given value of TIT, XMIX is substantially equal to or is greater than $XMIX_{peak}$, where $XMIX_{peak}$ occurs when the following conditions are both met simultaneously:

(i) the temperature of the superheated second working fluid vapor is substantially maximized; and (ii) the effective temperature of said exhausted mixture of the first and second working fluids is substantially minimized; and wherein the improvement comprises control means for controlling XMIX and SHIR along a maximum efficiency path as engine load varies such that as engine loads decrease, TIT is reduced.

3. A heat engine as in claim 2 wherein said control means includes a memory means wherein predetermined operating parameters are stored for substantially all load conditions, said operating parameters including SHIR and XMIX.

4. A heat engine as in claim 2 wherein said control means includes a memory, said memory storing predetermined information as to desired flow rates of said first and second working fluids and SHIR, for partial and over-load engine conditions.

5. A heat engine as in claim 2 wherein said control means comprises:

(a) memory means wherein predetermined operating parameters are stored for substantially all load conditions, said operating parameters including SHIR and XMIX;

(b) a first servo control system for controlling SHIR;

(c) a second servo control system for controlling XMIX; and wherein said memory means additionally stores predetermined control operating parameters for providing a setting, for said first and second servo control systems, for over-load and partial load requirements.

6. A heat engine as in claims 2, 3, 4, or 5 wherein said second working fluid comprises water.

7. A heat engine as in claims 2, 3, 4 or 5 wherein said second working fluid comprises water and said first working fluid comprises air and combustion products.

* * * * *